United States Patent
Rawal et al.

(10) Patent No.: US 11,163,452 B2
(45) Date of Patent: Nov. 2, 2021

(54) WORKLOAD BASED DEVICE ACCESS

(71) Applicant: Elastic Flash Inc., East Palo Alto, CA (US)

(72) Inventors: Darshan Bharatkumar Rawal, Fremont, CA (US); Monish Kumar Suvarna, Saratoga, CA (US); Naoki Iwakami, Redwood City, CA (US)

(73) Assignee: Elastic Flash Inc., Saratoga, CA (US)

(*) Notice: Subject to any disclaimer, the term of this patent is extended or adjusted under 35 U.S.C. 154(b) by 59 days.

(21) Appl. No.: 16/579,771

(22) Filed: Sep. 23, 2019

(65) Prior Publication Data
US 2020/0097183 A1 Mar. 26, 2020

Related U.S. Application Data

(60) Provisional application No. 62/735,330, filed on Sep. 24, 2018.

(51) Int. Cl.
G06F 3/06 (2006.01)
G06F 12/0891 (2016.01)

(52) U.S. Cl.
CPC .......... G06F 3/0611 (2013.01); G06F 3/0613 (2013.01); G06F 3/0644 (2013.01); G06F 3/0656 (2013.01); G06F 12/0891 (2013.01); G06F 3/0679 (2013.01)

(58) Field of Classification Search
CPC .... G06F 3/0604; G06F 3/0611; G06F 3/0613; G06F 3/0629; G06F 3/0644; G06F 3/0656; G06F 3/0679; G06F 3/0683; G06F 12/0891

USPC .......... 711/154, 170, 171, 172, 173
See application file for complete search history.

(56) References Cited

U.S. PATENT DOCUMENTS

| | | | |
|---|---|---|---|
| 6,023,722 A | 2/2000 | Colyer | |
| 7,921,178 B2 | 4/2011 | Haviv | |
| 2004/0158637 A1 | 8/2004 | Lee | |
| 2009/0210876 A1 | 8/2009 | Shen et al. | |
| 2009/0249018 A1* | 10/2009 | Nojima | G06F 3/0665 711/170 |
| 2015/0248366 A1 | 9/2015 | Bergsten et al. | |
| 2017/0046249 A1* | 2/2017 | Oliver | H04L 67/34 |
| 2017/0242594 A1* | 8/2017 | Liu | G06F 3/0611 |
| 2017/0364298 A1* | 12/2017 | Choi | G06F 3/0611 |
| 2018/0165033 A1* | 6/2018 | Baig | G06F 3/061 |
| 2020/0042906 A1* | 2/2020 | Gupta | G06N 20/00 |

OTHER PUBLICATIONS

Hollfelder, et al., "An Admission Control Framework for Applications with Variable Consumption Rates in Client-Pull Architectures", International Workshop on Multimedia Information Systems, Sep. 1998, 16 pages.

(Continued)

*Primary Examiner* — Gary J Portka
(74) *Attorney, Agent, or Firm* — IP Spring

(57) ABSTRACT

Technologies are described to perform workload based device access. An input-output (IO) request received from an application. An application profile for the application is determined. Based on the application profile, one or more IO parameter values to access a device are set. The device is accessed based on the one or more IO parameter values to fulfill the IO request.

15 Claims, 6 Drawing Sheets

(56) References Cited

OTHER PUBLICATIONS

Juvva, et al., "A Middleware Service for Real-Time Push-Pull Communications", Proceedings of IEEE Workshop, 1998, 7 pages.
Rajkumar, et al., "Resource kernels: a resource-centric approach to real-time and multimedia systems", Proceedings vol. 3310, Multimedia Computing and Networking 1998; (1997), Dec. 29, 1997, 18 pages.
Trivedi, "End-to-End Considerations in Unification of High-Performance IO", Doctoral Thesis, ETH Zurich, https://doi.org/10.3929/ethz-a-010651949, 2016, 207 pages.

* cited by examiner

WORKLOAD BASED DEVICE ACCESS

RELATED PATENT APPLICATIONS

This application claims priority to U.S. Provisional Patent Application No. 62/735,330, filed Sep. 24, 2018, entitled, "Workload based device access" and is related to U.S. provisional application Ser. No. 62/651,995 filed on Apr. 3, 2018, and entitled, "Workload based storage optimization", which are incorporated by reference in their entirety.

BACKGROUND

Modern hardware configurations that provide access to storage, compute servers, network bandwidth, etc. are optimized for local performance improvements.

For example, storage may be configured with multiple storage devices, e.g., in a redundant fallback configuration, to provide reliability. In another example, storage may be configured with additional layers, such as one or more caches, to provide an improved speed of access. In another example, an abstraction of storage, e.g., via an application program interface (API) call, may be provided to an application, with physical storage devices configured to process requests received via the API. In each of these examples, an application that accesses storage may be unaware of the actual storage configuration, performance parameters, reliability, etc. Further, as the demand from an application changes, storage configurations need to be updated to provide acceptable levels of performance.

In these configurations, optimizations are local to the storage configuration. For example, storage configurations may be provided with additional caches, e.g., if it is detected that quality of service (QoS) parameters of the speed of access for an application are not being met. In another example, meeting reliability QoS may be achieved by adding multiple redundant storage devices, e.g., hard drives, solid state devices (SSDs), etc. such that the failure of individual devices does not cause loss of data. Further, techniques such as error-detection and error-correction codes may also be implemented.

While such configurations may provide applications with storage that meets QoS, the configurations are expensive, e.g., due to additional hardware requirements (e.g., caches, redundant storage devices, etc.). Further, these configurations fail to provide predictable performance to an application. For example, when storage requests from an application experience a greater rate of cache hits, the application may experience better mean QoS than when the rate of cache hits is lower, but correspondingly a much larger tail latency when there is a cache miss. In another example, an application may experience different performance when the storage request accesses different hardware, e.g., an SSD with a higher bit-error rate (e.g., due to aging) may be slower than another SSD with a lower bit-error rate.

Many modern systems are implemented in a multi-tenant configuration. For example, virtualization technology enables multiple software applications to share the same physical compute hardware, access the same physical storage devices, and exchange data over the same physical network equipment.

While multi-tenancy offers several benefits, it can lead to greater unpredictability in performance. For example, if multiple applications attempt to access the same resource (e.g., storage drive, processor, etc.) at the same time, one or more of the applications may experience lower performance, than when such requests are made at different times. Overprovisioning is one strategy to provide predictable performance; however, overprovisioning is expensive.

This disclosure was conceived in light of some of these problems.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a computer-implemented method to fulfill an input-output (IO) request from an application. The method comprises receiving an input-output (IO) request from an application. The method further comprises determining an application profile for the application. The method further comprises setting one or more IO parameter values to access a device based at least in part on the application profile. The method further comprises accessing the device based on the one or more IO parameter values to fulfill the request.

In some embodiments, the method further includes determining an application type of the application based on a configuration setting prior to receiving the IO request, and in response to detecting that the application has launched. In some embodiments, the application type is determined as unknown, and setting the one or more IO parameters is based on a default template that includes default values for the one or more IO parameters.

In some embodiments, receiving the IO request comprises receiving at least one of the one or more IO parameter values from the application. In some embodiments, the one or more IO parameter values include values of one or more of a cache type parameter, a read-buffer parameter, a write-buffer parameter, a queue parameter, a journaling parameter, a mapping parameter, an error tolerance parameter, an access-type optimization parameter, or a storage-container parameter.

In some embodiments, the method further comprises determining, based on the application profile, that the application is tolerant of errors, and in response to determining that the application is tolerant of errors, setting the error tolerance parameter to a high value. In some embodiments, the application profile is based on one or more of an application type of the application determined based on an application identifier, a network port associated with the application, a source language for application code, an application execution environment in which the application executes, or application program code. In some embodiments, the application program code includes bytecode, compiled code, or source code.

In some embodiments, determining the application profile is based on at least in part on a plurality of prior IO requests from the application. In some embodiments, the method further comprises analyzing the plurality of prior IO requests to determine a respective proportion of create, read, update, and delete (CRUD) operations in the plurality of prior IO requests. In some embodiments, the method further comprises analyzing the plurality of prior IO requests to determine a proportion of IO requests that result in a cache invalidation or a cache miss. In some embodiments, the method further comprises determining a rate of IO request arrival based on the plurality of prior IO requests. In some embodiments, the method further comprises analyzing a size in bits of the plurality of prior IO requests, and based on the size of the plurality of prior IO requests, determining a bandwidth used by the application.

In some embodiments, the method further comprises analyzing a size in bits of the plurality of prior IO requests to determine one or more of: an average size, a median size, a maximum size, a minimum size, or a frequency distribution of the size. In some embodiments, the frequency distribution is normal distribution, wherein the method further comprises allocating a buffer for the application, and wherein a size of the buffer is within three sigma of a mean of the frequency distribution.

In some embodiments, determining the application profile based on the plurality of prior IO requests comprises grouping the one or more prior IO requests into one of more request groups based on a time of arrival of each of the plurality of prior IO requests, wherein each request group is associated with a respective sampling period and determining a value of a particular characteristic of the plurality of prior IO requests in each request group. In some embodiments, the method further comprises assigning a respective weight to each request group prior to determining the value of the particular characteristic. In some embodiments, the weights are assigned such a first request group associated with a recent sampling period is assigned a higher weight than a second request group associated with an earlier sampling period.

In some embodiments, each of the plurality of prior IO requests has a time of arrival within N seconds of receiving the IO request, and wherein N is an integer.

In some embodiments, the method further comprises allocating a buffer for the application, wherein a size of the buffer is determined based on the one or more prior IO requests from the application. In some embodiments, the size of the buffer is based on a respective proportion of each type of IO operation in the plurality of prior IO requests, and wherein the type is create, read, update, or delete (CRUD). In some embodiments, the buffer includes a respective sub-buffer for each type of request, and wherein the size of each respective sub-buffer is based on the proportion of the respective type of IO operation. In some embodiments, the one or more prior IO requests are requests to read data from the device, and wherein the size of the read-buffer is based on a size of data read for each of the one or more IO requests.

In some embodiments, the IO request includes a plurality of IO operations, and the method further comprises determining a respective size of the plurality of input or output operations and grouping the plurality of input or output operations into one or more groups, wherein a combined size of the operations in each group that is less than or equal to the size of the buffer. In some embodiments, the method further comprises determining that a size of an input or output operation specified in the IO request is larger than the size of the buffer and splitting the input or output operation into a plurality of sub-operations, wherein each sub-operation has a respective size that is that is less than or equal to the size of the buffer.

In some embodiments the device includes a storage device, and the application profile includes one or more of a storage capacity requirement, a storage bandwidth requirement, a storage access type, and a storage block size. In some implementations in which the device includes a storage device, the method further comprises determining one or more hardware characteristics of the storage device. In these embodiments accessing the device comprises accessing the storage device based on the one or more hardware characteristics. In some embodiments, the one or more hardware characteristics include a physical type of storage units in the storage device, a block size configured for the storage device, one or more configuration parameters of the storage device, or a size of the storage device.

Embodiments also relate to a computer-implemented method to access a device to fulfill an IO request from an application. The method includes receiving an IO request from an application. The method further includes determining an application profile for the application. The method further includes allocating a buffer for the application, wherein a size of the buffer is determined based on one or more prior IO requests from the application. The method further includes accessing a device to fulfill the request using the buffer to store application data.

In some embodiments, the size of the buffer is based on a respective type and proportion of each IO operation in the one or more prior IO requests, and wherein the respective type is one of create, read, update, or delete (CRUD). In some embodiments, the buffer is partitioned into respective sub-buffers for each of CRUD, and wherein the size of the sub-buffer is based on the respective type.

In some embodiments in which the IO request includes a plurality of IO operations, the method further comprises determining a respective size of the plurality of IO operations and grouping the plurality of input or output operations into one or more groups, wherein each group has a combined size that is less than or equal to the size of the buffer. In some embodiments in which the IO request includes a single input or output operation, the method further comprises determining that a size of the input or output operation is larger than the size of the buffer and splitting the IO operation into a plurality of input or output sub-operations, wherein each sub-operation has a respective size that is that is less than or equal to the size of the buffer.

Embodiments also relate to a computer-implemented method to transfer data between a storage device and a software application that executes in an application execution environment. The method comprises receiving a data transfer request from the software application. The method further comprises identifying the storage device from a plurality of storage devices based on the data transfer request. The method further comprises sending a command to the storage device directly from the software application to the storage device. The method further comprises receiving a response to the command. The method further comprises providing the response to the software application.

In some embodiments, the data transfer request is to write data to the storage device. In some embodiments, the data comprises one or more data units, and the command specifies a respective physical address within one or more individual storage units of the storage device for the one or more data units. In some embodiments, the method further comprises sending the data to the storage device. In some embodiments, sending the data to the storage device is performed without a context switch from the software application to an operating system.

In some embodiments, the command is sent without a context switch from the software application to an operating system. In some embodiments the data transfer request is to read data from the storage device, and specifies a memory address within user space memory allocated to the software application. In some embodiments, receiving the response comprises receiving the data directly from the storage device without a context switch to an operating system on which the software application executes, and the method further comprises writing the data directly to the user space memory allocated to the software application, based on the memory address.

In some embodiments, the user space memory is allocated to the software application, and providing the response to the software application comprises providing a pointer to the data written to the user space memory.

In some embodiments, the method is implemented in a software driver that executes within the application execution environment.

In some embodiments, the data transfer request is to read data from the storage device, receiving the response to the command comprises receiving the data, and providing the response to the software application comprises writing the data directly to a user space memory allocated to the software application, and after writing the data, providing a pointer to a memory address within the user space memory where the data is written.

In some embodiments, the method is implemented in a software driver that executes within the application execution environment, wherein at least a portion of the user space memory allocated to the software application is shared between the software application and the software driver, and wherein the memory address at which the data is written is within the portion of the user space memory.

In some embodiments, the method is implemented in a software driver that executes within the application execution environment and has access to at least a portion of user space memory allocated to the software application, wherein the data transfer request is to write data to the storage device and includes a pointer to a memory address within the user space memory, and wherein sending the command comprises reading the data directly from the portion of the user space memory based on the pointer, and sending the data to the storage device.

DETAILED DESCRIPTION

Figure 1:
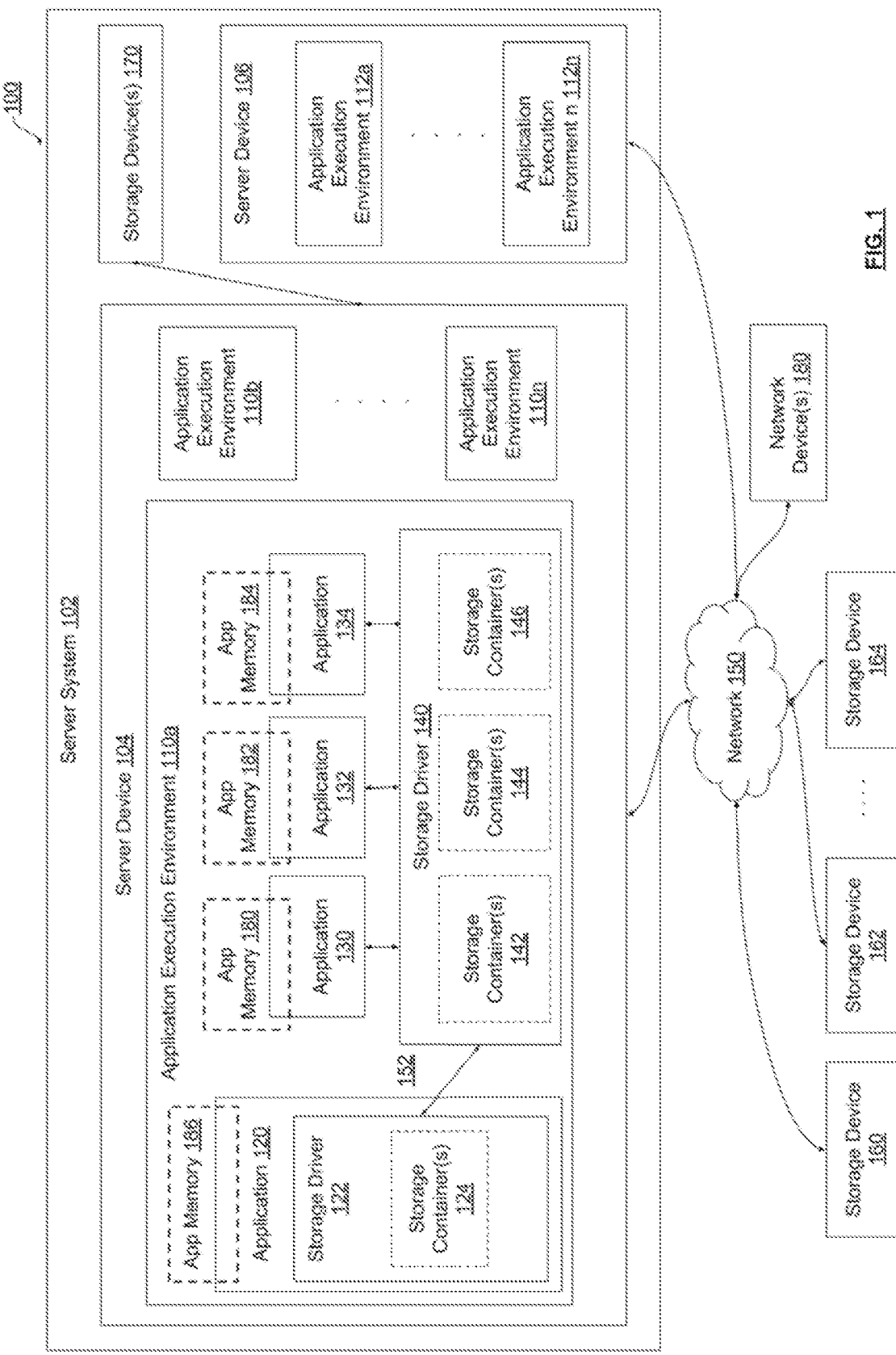
FIG. 1 is a block diagram of an example network environment 100 which may be used for one or more implementations described herein.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

FIG. 1 illustrates a block diagram of an example network environment 100, which may be used in some implementations described herein. In some implementations, network environment 100 includes one or more server systems, e.g., server system 102. Server system 102 (and other server systems in network environment 100) can communicate with each other, with one or more direct attached storage devices, e.g., storage device(s) 170, with networked storage devices 160, 162, and 164, and with other systems, e.g., database systems, client devices, storage devices, etc.) over network 150.

Server system 102 can include one or more server devices. For example, server system 102 may be a single server, e.g., with a single main processing board (motherboard) and one or more processors. In another example, server system 102 may include a plurality of servers (e.g., server devices 104 and 106), e.g., arranged in a server rack, in multiple server racks in a data center, in multiple data centers, etc. In this example, the plurality of servers are configured to communicate with each other via various mechanisms, e.g. over network 150.

A server device (e.g., server device 104, 106) in a server system may be configured to provide one or more application execution environments, e.g., software environments for execution of one or more software applications. A server device may include hardware that supports execution of software applications, e.g., one or more processors such as a central processing unit (CPU), graphics processing unit (GPU), application specific integrated circuit (ASIC), field programmable gate array (FPGA), etc.), memory (including volatile memory, e.g., dynamic random access memory (DRAM), and/or non-volatile memory, e.g., hard disk, flash memory, magnetoresistive RAM (MRAM), resistive RAM (ReRAM) such as 3D XPoint™, etc.), network interface, and other hardware.

For ease of illustration, FIG. 1 shows one block for server system 102 that includes two server devices 104 and 106. Server blocks 102, 104, and 106 may represent multiple systems, server devices, and other network devices, and the blocks can be provided in different configurations than shown. For example, server system 102 can represent multiple server devices that can communicate with other server systems via the network 150. In some implementations, server system 102 can include cloud hosting servers, for example. In some examples, storage devices 160-164 and/or storage device(s) 170 can be provided in server system block(s) that are separate from server device 104 and can communicate with server device 104 and other server systems via network 150. In some implementations, network environment 100 may not have all of the components shown and/or may have other elements including other types of elements instead of, or in addition to, those described herein.

Server devices may also be referred to as compute devices. For example, a server device or a compute device may include general purpose processing hardware (e.g., CPU, GPU, FPGA, etc.) and/or special purpose processing hardware (e.g., ASIC, accelerators, etc.) that is configured to perform data processing tasks.

Network-attached storage devices 160, 162, and 164, and direct-attached storage device 170 may be any type of storage devices, e.g., that provide long-term and/or short-term data storage. For example, storage devices 160-164 may include volatile memory (e.g., DRAM, static RAM (SRAM), etc.) and/or non-volatile memory (e.g., non-volatile RAM (NVRAM), MRAM, flash memory, hard disk drives, phase change memory, 3D Xpoint™, resistive RAM, etc. In some implementations, e.g., in the example illustrated in FIG. 1, storage devices 160-164 are coupled to server system 102 via network 150, e.g., as a storage area network (SAN), as network attached storage (NAS), etc.

In some implementations, e.g., in the example illustrated in FIG. 1, storage device(s) 170 may be coupled to server device 104 via direct attached storage protocols, e.g., non-volatile memory express (NVME), serial attached SCSI (SAS), etc. In some implementations, a storage device can be coupled to one, two, or more server devices (e.g., server device 104 and server device 106) using non-volatile memory express over fabric (NVMEoF) protocol. Storage device(s) 170 can include a plurality of storage devices, e.g., solid-state disks, hard drives, etc. In some implementations, a storage device of storage device(s) 170 may be coupled to one of server device 104 or server device 106. In some implementations, a storage device of storage device(s) 170 may be coupled to both server devices. In some implementations, both direct attached and/or network-attached storage devices may be used. In some implementations, storage devices may be directly coupled to or be a part of server system 102, e.g., coupled to one or more of server devices 104 and 106 via a direct connection (e.g., via peripheral component interconnect (PCI) bus, universal serial bus (USB), etc.). In some implementations, storage devices may include any number of storage devices directly coupled to server system 102, and one or more devices coupled to server system 102 via network 150.

In some implementations, storage devices 160-164 and/or storage device 170 may be solid-state storage devices, e.g., that utilize flash memory or other solid-state data storage technology. In some implementations, a storage device may include a plurality of channels. Each channel may be configured with a plurality of storage chips that can store blocks of data, organized into pages. In some implementations, the plurality of channels may be configured such that only a subset of chips (e.g., a single chip) within a channel can be accessed at a particular instant and other chips are not accessible at the particular instant, e.g., in a serial access configuration. Further, in these implementations, the plurality of channels may be configured to enable concurrent access, e.g., any number of channels (e.g., a subset of the channels, all channels, etc.) may be accessed at any particular instant, e.g., in a parallel access configuration. In some implementations, a storage device may include a storage controller (e.g., a special purpose microprocessor) that facilitates access to the storage device.

In some implementations, network device(s) 180 may be coupled to server system 102 via network 150. Network device(s) 180 may include any type of device that can send data to and receive data from server system 102. For example, network device(s) 180 may include e.g., network management devices, e.g., switches, routers; other servers or server systems; etc.

Network 150 may be any type of network that enables various systems to exchange data. Network 150 can be any type of communication network, including one or more of the Internet, local area networks (LAN), wireless networks (e.g., 802.11 networks, Bluetooth®, etc.), switch or hub connections, etc. In some implementations, network 130 can include peer-to-peer communication between devices, e.g., using peer-to-peer wireless protocols (e.g., Bluetooth®, Wi-Fi Direct®, etc.), etc. In some implementations, network 150 may include a wired network, e.g., a gigabit ethernet network and/or a wireless network, e.g., an 802.11 network, a Zigbee® network, etc.

In the example illustrated in FIG. 1, server device 104 is illustrated as providing a first plurality of application execution environment 110a-110n (referred to individually as 110a, 110b, . . . , 110n, and collectively as 110), and server device 106 is illustrated as providing a second plurality of application execution environments 112a-112n (referred to individually as 112a, 112b, . . . , 112n, and collectively as 112). A server device may provide any number of application execution environments, e.g., one application execution environment, or two or more application execution environments. For example, the number of application execution environments provided by a server device may be based on a number and type of software applications to be executed within the application execution environments on the server device, hardware configuration of the server device, connectivity of the server device to other devices, network bandwidth available to the server device, etc.

An application execution environment as described herein can be any software environment that supports execution of a software application. For example, an application execution environment may be an operating system (e.g., Linux, Windows, Unix, etc.), a hypervisor that supports execution of one or more virtual machines (e.g., Xen®, Oracle VM Server, Microsoft Hyper-V(™), VMWare® Workstation, VirtualBox®, etc.), a virtual computer defined by a specification, e.g., a Java Virtual Machine (JVM), an application execution container (e.g., containers based off Linux CGroups, Docker, CoreOS, or the like), a process executing under an operating system (e.g., a UNIX process), etc. In some implementations, the application execution environment may be a software application, e.g., that is configured to execute on server hardware.

Each application execution environment may be configured to support execution of any number of software applications. For example, application execution environment 110a is illustrated as having a plurality of applications (120, 130, 132, and 134) executing within the application execution environment. Each of the plurality of applications may have a respective portion of the memory of server device 104 allocated to it, e.g., app memory 180-186, as illustrated in FIG. 1.

In some implementations, a portion of the memory allocated to an application may be shared between the application and the application execution environment 110a. In these implementations, both the application and the application execution environment are configured to access the memory, e.g., to read or write data. These implementations may provide a benefit that data accessed from a storage device can be written directly into application memory, without having to perform a context switch between the application and application execution environment. Further, applications may be able to access storage hardware directly, without the context switch. In some implementations, the application memory is reserved for use by the application and is not shared with the application execution environment As illustrated in FIG. 1, application 120 includes a storage driver (122) that stores data regarding storage container(s) 124 allocated to the application, per techniques of this disclosure. Storage container(s) 124 may be one, two, or more storage containers. In this example, storage driver 122 is part of application 120 itself and is not provided separately within the application execution environment. Storage driver 122 is configured to provide application 120 access to storage devices coupled to server device 104.

Further, other applications (130, 132, 134) are illustrated as accessing a storage driver (140) provided within the application execution environment 110a. Storage driver 140 may be a software application that is configured to provide other applications within an application execution environment access to one or more storage devices coupled to server device 104, e.g., storage device(s) 170 coupled to server device 104 as direct-attached storage devices and/or any of storage devices 160-164.

In some implementations, storage drivers for various applications, e.g., storage driver 122 included in application 120 and storage driver 140 that provides storage for applications 130, 132, and 134, may communicate with each other. In some implementations, the communication between the storage drivers may be in a peer-to-peer manner, e.g., as illustrated in FIG. 1 by peer-to-peer connection 152. In some implementations, e.g., when three or more storage drivers communicate with each other, such communication may be performed using a mesh connection between the storage drivers (e.g., a software-defined mesh).

For example, storage driver 122 and storage driver 140 may send control plane messages to each other, e.g., to arbitrate access to storage devices. For example, if three applications issue storage access commands, each storage command may correspond to one or more storage devices that are part of a storage container allocated for each respective application. In a mesh configuration, where a respective storage driver for each application communicates with storage drivers for other applications, control plane messages may be used by each storage driver to avoid conflict in accessing the physical storage device. Similar communications may be handled in a peer-to-peer manner between storage drivers of any pair of applications. In both the above examples, the storage driver communicates directly with the storage device, while using communication with other storage drivers for control plane signaling messages.

In some implementations, a centralized master, e.g., implemented in any of the storage drivers (e.g., storage driver 122 or storage driver 140) or as part of an operating system (e.g., part of boot-up configuration) of a server device that provides the applications, may be configured such that it is responsible for storage container configuration. In this example, the centralized master may receive control plane messages, and provide instructions to each storage driver to access a storage device in a manner that eliminates conflict between different storage drivers.

In some implementations, storage driver 122 may store information regarding storage (e.g., non-volatile storage) configured for use by application 120. In the example illustrated in FIG. 1, storage driver 122 stores information for a storage container 124 configured for application 120. Similarly, storage driver 140 may store information regarding storage configured for access by each respective application, e.g., storage container(s) 142 corresponding to application 130, storage container(s) 144 corresponding to application 132, and storage container(s) 146 corresponding to application 134.

In some implementations, information for storage containers 124 and/or storage containers 142, 144, and 146, may include identification information of one or more storage devices (e.g., storage devices 160, 162, and 164) that store data for a corresponding application. For example, data for application 130 may be stored in a plurality of storage devices, and information regarding individual storage units (e.g., memory cells, pages, blocks, chips, etc.) that stored data for application 130 may be accessible from storage container 142. As used herein, storage container refers to a software-defined aggregation of storage units that may be part of an individual storage device (e.g., an SSD drive) or may be spread across multiple storage devices.

Figure 2:
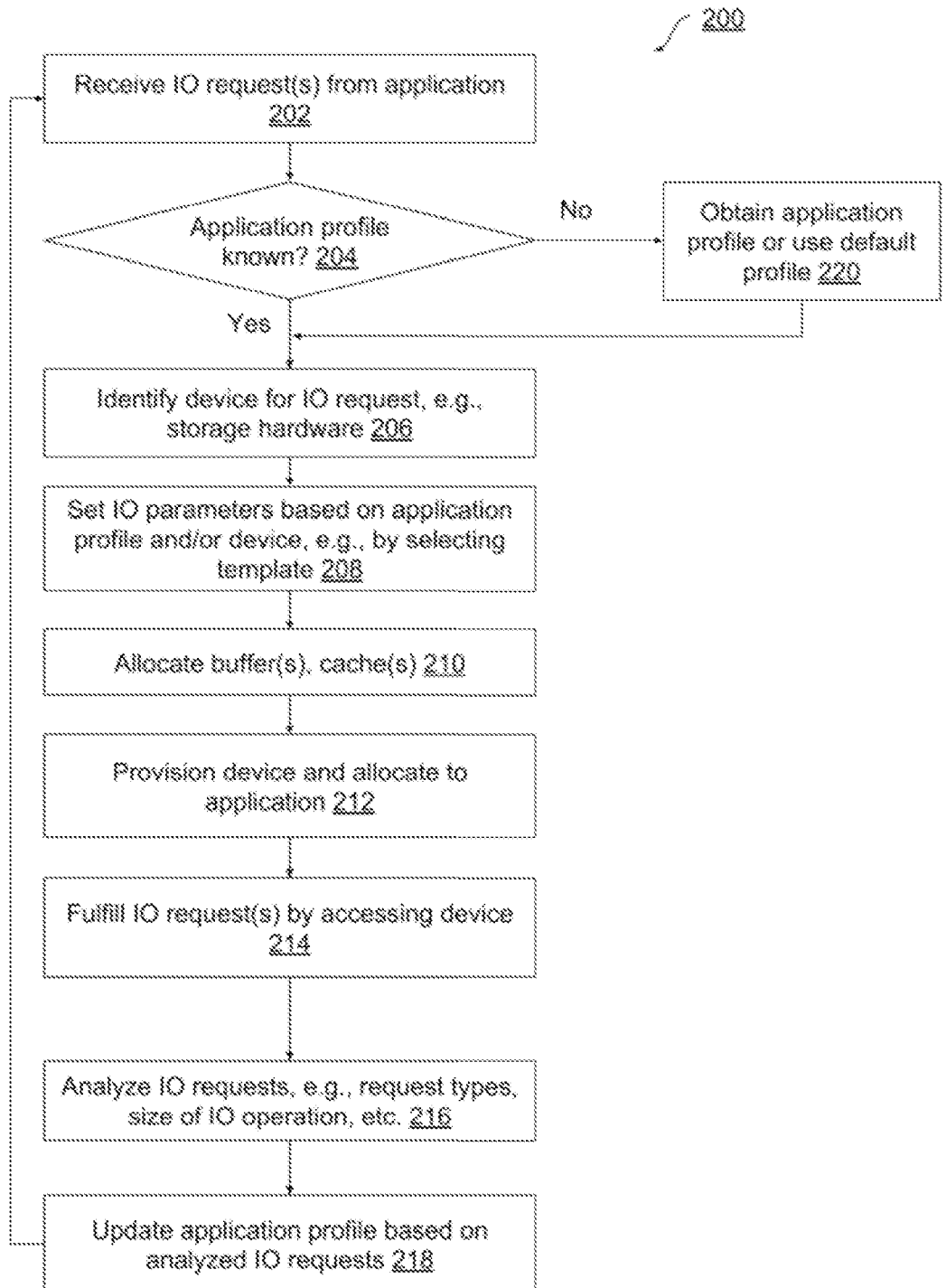
FIG. 2 is a flow diagram illustrating one example of a method 200 to access a device to fulfill an input-output (IO) request, according to some implementations.

FIG. 2 is a flow diagram illustrating one example of a method 200 to access a device to fulfill an input-output (IO) request, according to some implementations. In some implementations, method 200 is performed in response to detecting that an application (e.g., a software application) has launched, upon receiving a first IO request from an application, a new IO request from a previously launched or suspended application, etc. The method 200 may be implemented by a device access module included within the software application, e.g., by incorporating a software library that includes code for the device access module and/or as a separate device access module, as explained with reference to FIGS. 3A and 3B.

In block 202 of method 200, one or more IO request(s) are received from an application, by the device access module. For example, the IO requests may be a request to write data to storage or to read data from storage. The storage may be a storage device included in a computing device that implements method 200, a direct-attached storage device coupled to a computing device that implements method 200, or a network-based storage device that is accessible by a computing device that implements method 200. In another example, the IO requests may be to access a network device, e.g., another computing device such as another server or server system, a network appliance, a networked storage device, etc. In some implementations, the IO requests may include storage access requests, requests to access a network device or both.

In some implementations, an IO request may include a single IO operation. For example, the single IO operation may be an operation to write new data to a storage device (C), read data from a storage device (R), update data on a storage device (U), or delete data from a storage device (D). Similar operations are also possible for a network device, e.g., a server or computing device, a network appliance, etc. For simplicity, the rest of this document refers to the IO operations as CRUD operations. A CRUD operation may be understood as any of create, read, update, or delete operation, performed by accessing a storage device and/or a network device. In some implementations, an IO request may include multiple IO operations. In some implementations, the different IO operations may be performed by accessing the same storage or network device, or by accessing respective devices for each of the different IO operations. In some implementations, an IO request may specify one or more IO parameter values that are to be used to fulfill the IO request. IO parameters are discussed below with reference to block 208. Block 202 may be followed by block 204.

In block 204, it is determined by the device access module whether a profile is known for the application. The application profile may be based on an application type and may include one or more parameters determined for the application. For example, the application type may be, e.g., an online transaction processing (OLTP) application that utilizes a traditional relational database, e.g., that supports the structured query language (SQL) and provides atomicity, consistency, isolation, durability (ACID) guarantees; an OLTP application that utilizes a NoSQL database, a key/value store, etc.; a backup or virtual desktop infrastructure (VDI) that utilizes binary large object (BLOB) storage, etc. Other types of applications and sub-types within these types are possible. The application profile may also be based on a network port associated with the application, a programming language used for the application code (e.g., an interpreted language such as JavaScript, Python, etc., a compiled language such as C++, etc.), an application execution environment for the application (e.g., a Java Virtual Machine, Linux or other operating system, an execution container that specifies a particular combination of one or more of hypervisor, operating system, database, and other software components, etc.), or the application program code (e.g., source code such as JavaScript, Python, etc.; compiled executables; or intermediate representations, e.g., bytecode), etc.

If it is determined in block 204 that the application profile is known, block 204 may be followed by block 206. If it is determined in block 204 that the application profile is not known, block 204 may be followed by block 220.

In block 220, the application profile may be obtained by the device access module. For example, an application identifier for the application may be determined, e.g., based on a process name, a name of a running executable file of the application, the IO requests generated by the application, etc. Based on the application identifier, an application type may be determined, and a corresponding application profile may be selected from available profiles. Alternatively, the application type may be specified in a configuration setting. In some implementations, e.g., when the application identifier cannot be determined or does not correspond to a known application type, a default profile may be used.

In some implementations, the application profile may be determined by the device access module. based on prior IO requests from the application. For example, prior IO requests from the application (e.g., within a prior period of time such as one minute, one hour, one day, or other periods of time) may be analyzed to determine the application profile. In this example, prior IO requests that have a time of arrival within N units of time of a current IO request may be considered to determine the application profile. In some implementations, a certain number (e.g., ten thousand, one million, etc.) of prior IO requests may be utilized to determine the application profile.

For example, the prior IO requests may be analyzed to determine a respective proportion of different types of IO operations in the prior IO requests, e.g., a proportion of each of create, read, update, and delete (CRUD) operations. For example, a pattern of IO requests may be determined for the application, e.g., 10% C, 10% D, 40% U, 40% R; 70% C, 20%D, 0%U, 10% R, etc. The pattern of IO requests may be included in the application profile and may be utilized to determine one or more parameter values, e.g., as described with reference to block 208.

In some implementations, the prior IO requests may be analyzed to determine a proportion of the IO requests that result in a cache invalidation or a cache miss, e.g., when the method is implemented by a device access module that utilizes caching to service IO requests. For example, the proportion of IO requests may be included in the application profile and may be utilized to determine a value of one or more parameters, e.g., the cache type parameter, the read-buffer parameter, and the write-buffer parameter, e.g., as described with reference to block 208. In some implementations, a rate of IO request arrival may be determined based on the prior IO requests. For example, the rate of request arrival may be determined based on an average duration of time (or a median duration of time, or other statistical value) between consecutive IO requests in the prior IO requests. The rate of request arrival may be stored in the application profile, and utilized to set parameter values, as described with reference to block 208.

In some implementations, the prior IO requests may be grouped based on a time of arrival of each request. For example, the grouping may be based on a sampling period, e.g., 30 seconds, one minute, five minutes, etc. The groups may be associated with a respective time period, and be referred to based on time, e.g., if a current time is t, the most recent group may be numbered 1, the next-most-recent group may be numbered 2, and so on. Grouping the prior IO requests in this manner may provide a benefit by averaging variation in the characteristics and allow determining a value of a particular characteristic of the prior IO requests.

In some implementations, a respective weight may be assigned to each request group. For example, recent groups may be assigned a higher weight, and older groups may be assigned lower weights. Such assignment of weights ensures that recent IO requests (indicative of a recent pattern of access from the application) have a greater impact on the application profile. For example, the weights may decrease linearly, or non-linearly based on a difference between the current time t and the sampling period during which requests in each request group were received. Assignment of weights in this manner ensures that a first request group associated with a recent sampling period is assigned a higher weight than a second request group associated with an earlier sampling period.

Values of a particular characteristic of the prior IO requests may be determined based on the grouping, and the respective weights, if assigned. For example, the particular characteristic may be a statistical value of a characteristic, e.g., average size in bits of the prior IO requests, a proportion of each of CRUD operations in the prior requests, etc.

In some implementations, a size in bits of the prior IO requests (e.g., an average size, a maximum or minimum size, a median size, etc.) may be analyzed. In some implementations, a frequency distribution of the size in bits of the prior IO requests may be determined. In some implementations, the size in bits and/or the frequency distribution may be utilized to determine a bandwidth (e.g., storage access bandwidth, network access bandwidth, etc.) utilized by the application. The determined bandwidth may be stored as a bandwidth requirement of the application in the application profile. For example, the bandwidth requirement may be utilized in block 206 to identify a device to fulfill the IO request, and/or in block 208 to set values of one or more of the IO parameters. For example, if the frequency distribution is the normal distribution, the read-buffer and/or the write-buffer parameters may be set to a value that is within a range of the mean of the frequency distribution, e.g., within three sigma of the mean. Block 204 may be followed by block 206.

In block 206, a device is identified by the device access module to complete the IO request. In some examples, the IO request from the application may specify the device, e.g., by a storage device identifier, by a network identifier, etc. For example, the storage device may be identified by a port (e.g., USB port) to which the storage device is connected, when the storage device is external to a computing device that implements the method. In another example, the storage device may be identified by a storage container identifier, where the storage container corresponds to a collection of storage devices, e.g., SSD devices that include a number of flash memory chips. In another example, the storage device may be identified by a device name (e.g., Unix volume, mount point, or other identifier). In some examples, e.g., when the storage device may be identified by a network port and/or protocol that is used to couple the storage device to the computing device that implements the method. For example, network-attached storage devices may be identified in this manner.

In some implementations, the IO request may not specify the device. In these implementations, one or more devices, e.g., storage hardware, network devices, etc. may be identified that can be accessed to fulfill the IO request. For example, the device may be identified based on a type of operation specified in the IO request, e.g., create, read, update, or delete. In some implementations, the device may also be identified based on the application type. Block 206 may be followed by block 208.

In block 208, one or more IO parameters are selected to access the device identified in block 206. For example, an application template that specifies one or more IO parameters to access a device to fulfill IO requests generated by the application may be selected. For example, selecting the application template may include setting values of the IO parameter based on the application profile and/or identified device. In some implementations, IO requests may be received from a plurality of applications, each with a corresponding application profile. In some implementations, different application templates (with different values of IO parameters) may be used for different application types. Further, the IO requests may be received during different execution stages of an application. In some implementations, different application templates may be used during different execution stages of the same application.

In implementations where the application profile is not known, e.g., when a default profile is selected in block 220, a default application template that specifies default values of IO parameters may be utilized. In some implementations, an application template may be created based on analyzing the IO requests from the application. For example, for an application that is initially configured to use the default template, values of one or more IO parameters in the default template may be modified based the analysis of IO requests from the application to generate an application-specific template. Further, the application type may be determined at runtime, e.g., while fulfilling IO requests from the application, and a corresponding application template may be utilized.

The application profile may include, e.g., a type of IO operations included in IO requests from the application. For example, an application that utilizes a traditional relational database management system (RDBMS) may generate portable operating system interface (POSIX)-compliant IO operations, while another application that uses a NoSQL database may generate IO operations as simple key-value pairs. In another example, a backup or virtual desktop infrastructure (VDI) application may generate IO operations that access binary large object (BLOB) data in storage.

In some implementations, e.g., when the IO requests are requests to access a storage device, the application profile may include parameters such as a storage capacity requirement (e.g., "very large" for an application that stores videos or multimedia; "small" for an application that stores key-value pairs, e.g., page visit counts for web pages; etc.), a storage bandwidth requirement (e.g., "high" for an application that accesses a large amount of data in a short time interval, e.g., a video application), a storage access type (e.g., "read-only" for data warehousing applications, "append-only" for applications that generate and store logs, "read and write" for database applications, etc.), and a storage block size (e.g., 1 MB for an application that uses an object-API to write data to storage; 4 KB for an application that writes key-value pairs that are of size 4 KB each, etc.).

In some implementations, such parameters in the application profile may be used to set or update hardware settings on the storage device (e.g., a page size of an SSD device, an error-detection/error-correction code on a hard disk, etc.). In some implementations, other parameter values, such as a firmware capability of the storage device, an age (e.g., an average age, a median age, or other statistical value, or a frequency distribution of age) of the storage device or individual storage units (e.g., flash memory chips) of the storage device, historical error rates of storage devices accessed by the application, may also be included in the application profile. Cache type parameter In accessing a device, e.g., a storage device, some applications may benefit from the use of a cache, e.g., a storage cache. Based on the application type, a parameter may include a cache type parameter that specifies whether a cache is to be used to fulfill IO operations (CRUD) in the IO requests from an application, and a type of the cache to be used. In some implementations, the value of the cache type parameter may be determined by the device access module based on the type of operations in the IO requests from the application.

For example, a cache type parameter may indicate that a write-back cache is to be used for a particular application, e.g., such that writes to actual storage or network locations are deferred, e.g., until the time the particular portion of the cache is to be updated by writing data to a device. For example, the cache type parameter may indicate that a write-back cache be used for an application that utilizes a traditional RDBMS.

For example, an RDBMS or an application that utilizes an RDBMS may generate IO requests that include any of the CRUD operations, e.g., using a POSIX-compatible application programming interface (API). Such applications may benefit from the use of a write-back cache. Since such applications can perform in-place updates of data, the cache used for write operations is selected so as to ensure that values corresponding to keys that are previously stored are updated per the most recent IO request to write to the key. Since the application requires a guarantee that the most recent value is written, write-back is selected as the value of the cache type parameter for the application.

In another example, the cache type parameter may indicate that a write-direct cache is to be used for a particular application. For example, a write-direct cache may be used for an application that utilizes a NoSQL database. For example, if the NoSQL database is utilized such that the IO requests include only create or read operations (e.g., as is the case when using a key-value API with an append-only option for data), the application may benefit from the use of a write-direct cache. Since the application writes data only as create operations, e.g., a new value corresponding to a previously stored key is appended in the data storage device, and automatically invalidates the previously stored value, the cache can be implemented as a write-direct cache where key-value pairs from the IO request are cached and written to the device when the device is available. Since the application does not require in-place updates, write-direct is selected as the value of the cache parameter for the application. In some implementations, the cache parameter can include one or more sub-parameters, e.g., maximum size of the cache; a rate at which data from the cache is flushed to a storage device; cache eviction policy, e.g., least-recently used (LRU), most-recently used (MRU), oldest first, etc.; a unit of cache size (e.g., 4 K, 64 K, 128 K, etc.)

In some implementations, an application may never generate any update operations, and instead, only performs append operations (A). In these implementations, the cache may be bypassed to perform a write directly to the device (e.g., storage device) via zero copy. In these implementations, contents of the cache do not become invalid after the write because the application does not use update operations.

In some implementations, update (U) operations from an application may be implemented by using a read-before-write paradigm. In these examples, a current value of data may be read from the device, prior to writing a new value of the data. If the read-before-write paradigm is utilized, the cache type parameter is selected such that a write-back cache is used. If a write-back cache is used, zero-copy (e.g., direct copy from a device to memory), explained with reference to FIGS. 4 and 5 below, is not utilized. If the read-before-write paradigm is not utilized, e.g., when updates overwrite previously stored data values, a write-ahead (or write-direct) cache may be utilized. If a write-ahead cache is used, zero copy can be utilized.

In another example, for other applications, e.g., that utilize BLOB storage, the parameter may specify that no cache is to be used. For example, an application that specifies IO requests that utilize an object API, may not benefit from the use of a cache. Since the IO requests from the application are only of type C, R, or D, and do not include updates, "no-cache" may be selected as the value of the cache type parameter for the application. Other types of applications may utilize other types of caches. For applications for which the cache type parameter has a value that indicates that a cache is to be implemented, a portion of the physical memory of the computing device that implements the method may be allocated to support transient in-memory storage of data corresponding to IO requests generated by the application. For example, the portion of the physical memory may be allocated as buffers where data is copied during fulfillment of an IO request. For example, data generated by the application that is to be written to a device, e.g., by create or update operations, may be stored in the buffers. Similarly, for read operations, data retrieved from a device may be stored in the buffers.

Read-Buffer and Write-Buffer Parameters

One or more further parameter may specify a size of the buffers for an application. The size of the buffers may be based on the application type. A read-buffer parameter may be used to specify a size of a read buffer. For example, small read buffers, e.g., of a size between 4 KB to 64 KB, may be used for NoSQL applications, medium read buffers, e.g., of a size between 64 KB to 256 KB may be used for online transaction processing (OLTP) applications that use an RDBMS, and large read buffers, e.g., between 256 KB to 1 MB, or larger, may be utilized for other applications, e.g., virtual desktop infrastructure (VDI) or backup applications.

A write buffer parameter may be used by the device access module to specify a size of a write buffer. For example, medium write buffers, e.g., between 64 K to 256 K, may be utilized for NoSQL or RDBMS applications, while large write buffers, e.g., 256 KB to 1 MB, or larger, may be used for other applications.

Queue Parameter

In some implementations, queues may be implemented by the device access module for the operations in the IO requests. For example, in some implementations, separate queues may be implemented for C, R, U, and D operations. Queues may be implemented in the physical memory of a computing device that implements the method. Queues may hold metadata, e.g., pointers to buffers that are configured to store data for the application. In some implementations, queues may be implemented in a lock-free manner (e.g., when the cache type is write-direct). For example, applications that utilize a NoSQL database or other key-value based accesses, or access data as objects (e.g., binary large objects—BLOB) to a device, queues may be implemented in the lock-free manner, e.g., such that multiple concurrent IO operations that access the same data, e.g., same key-value pair, are permitted. In these implementations, the queue parameter may be set to a value "lock-free."

In some implementations, queues are implemented utilizing locks, such that only one IO operation at a time can access particular data. For example, queues utilizing locks may be implemented for OLTP applications that utilize an RDBMS. In these implementations, the queue parameter may be set to a value "locked." In some implementations, such applications can alternatively be implemented with lock-free queues (with queue parameter set to "lock-free"), e.g., if the cache is locked such that concurrent IO operations to same key-value pair (or other data) are denied.

In some implementations, the queue parameter may specify whether separate queues are to be utilized for different operation types (CRUD), in addition to or alternative to the "locked" or "lock-free" of the parameter. For example, the queue parameter may specify that separate queues are to be used for different operations, e.g., individual queues for each of C, R, U, and D operations. In this example, the queue parameter may specify "separate" or "4" to indicate that four different queues are to be implemented. Any number of queues may be implemented. For example, two queues may be implemented such that read operations are in a first queue, while create, update, and delete operations are in a second queue.

Implementing queues and/or buffers may allow grouping multiple IO operations (also referred to as batching) into a single device access or splitting a single IO operation (also referred to as chunking) into multiple device accesses.

For example, batching may be advantageous, e.g., when a size of data in a particular IO operation is smaller than a size of an individual unit of memory, e.g., when an IO operation specifies access to 30 bytes of data, while memory units are sized 1 KB. Some applications, e.g., that utilize key-value or NoSQL databases, may generate a large number of IO requests that are associated with small data values, e.g., read operations that specify key values of 30 bytes. Batching may be advantageous by combining multiple operations into a single device access, thus distributing the overhead of device access across the multiple operations.

Similarly, chunking may be advantageous, e.g., when a size of data in a particular IO operation is larger than a size of an individual unit of memory, e.g., when an IO operation specifies access to 10 MB of data, while memory units are sized 64 KB. Some applications, e.g., that utilize BLOB storage, may generate a large number of IO requests that are associated with large data values, e.g., write operations that specify objects of 10 MB. Chunking may be advantageous by splitting the single write operation into multiple accesses to a storage device such that each write to the storage device corresponds to a smaller size of data, e.g., 64 KB.

Journaling Parameter

In some traditional implementations, journaling is used, e.g., when storing data to a storage device in response to an IO operation. Journaling may be implemented as a feature of a filesystem and may allow, e.g., rollback of one or more IO operations, provide a sequential record of IO operations, etc. In the described implementations, method 200 may be implemented as part of a device access module that accesses a device directly, e.g., by specifying physical storage addresses of a storage device. The device access module may selectively choose to implement journaling, e.g., based on the application type.

For example, journaling is beneficial to some applications, e.g., applications that require guarantees that data written to a storage device is retrievable. For such applications, the journaling parameter may be set to yes. In these implementations, create or update operations may be performed by the device access module such that modifications are made to storage units in a storage device in a manner that can be rolled back, and that provides guarantees that the written data is retrievable.

Some applications, e.g., applications that write key-value pairs that are frequently updated (e.g., Internet-of-Things applications that write new values for keys at frequent intervals, e.g., sensor readings for instantaneous temperature, etc.) may not substantially benefit from the overhead of journaling. For such applications, the journaling parameter may be set to "no." For applications that generate update operations that do not utilize the read-before-write parameter, the journaling parameter is set to "no." For applications that generate update operations that utilize the read-before-write parameter, the journaling parameter is set to "yes."

Mapping Parameter

In some implementations, an IO request from an application may specify a particular address, e.g., a storage unit address, a network address, etc. from where to read data, or to which data is written. In some implementations, the address may be a logical block address. Depending on the type of application, the logical block address may be mapped to a physical address, such as a particular page (or another storage unit) in an SSD device, by the device access module. Logical block address (LBA) to physical block address (PBA) mapping may be implemented with an in-memory implementation, e.g., a HashMap. In different implementations, the hashmap can be locked or lock-free. In some implementations, a mapping parameter may be utilized to specify whether the mapping is implemented in a locked or lock-free manner.

For some applications, e.g., applications that perform IO operations using a read-before-write aradigm, the mapping between logical and physical addresses may be locked, e.g., the mapping parameter may be set to the value "locked." Such implementations may ensure data integrity, e.g., by performing create or update operations in a manner that ensures that a single copy of data is accessed. A locked mapping may be utilized, e.g., by RDBMS or similar applications.

Some applications, e.g., applications that perform IO operations without using the read-before-write paradigm, the mapping parameter may be set to the value "lock-free." For example, applications that utilize NoSQL database or object storage may be tolerant of multiple versions or copies of data, since the application may have built-in features to correctly determine the correct version (e.g., based on a creation timestamp). In another example, the mapping parameter may be set to "lock-free," e.g., it is known (based on the application type, prior IO requests, etc.) that the application does not generate an update (U) request.

Error Tolerance

Some applications may be highly tolerant of errors in the fulfillment of IO requests. For example, applications that maintain multiple copies of data in storage, e.g., in a fault-tolerant or redundant fashion within a single server, or across different servers, may be designed to tolerate IO errors. For example, IO requests from these applications, e.g., to read certain data, may be simultaneously sent to the multiple copies, and failure of any individual request may be tolerated since other requests may be successfully completed.

In another example, some applications, e.g., applications that can tolerate high latency, may also be tolerant of errors. For example, if the service guarantee of time of completion for an IO request is substantially smaller than the high latency, simple retries of a failed IO request may suffice.

In another example, some applications may be tolerant of IO requests not being fulfilled, e.g., consecutive writes from an IoT sensor may have insignificant variation in values, and in some instances, the applications may be designed in a fault tolerant manner, e.g., where absence of individual values does not lead to application-level errors.

In different implementations, the error tolerance ability of an application may be specified in a configuration setting, or may be determined based on one or more of: the application type; an identifier of the application; a type of device accessed by the application, e.g., a storage device that provides guarantees); prior IO requests from the application; etc. Accordingly, the error tolerance parameter for an application may be set, e.g., to a "high," "medium," or "low" value. The parameter can also be set as a numeric value that corresponds to the level of errors that an application can tolerate.

In implementations where the application does not specify a device to fulfill IO requests, the device may be selected by the device access module based on the error tolerance parameter. For example, for applications with "low" value of the error tolerance parameter, a storage device with built-in redundancy (e.g., in a redundant array of independent disks (RAID) configuration) and/or high reliability (e.g., SSD with low wear levels, SSD with high quality flash memory units, storage with error correction capability) may be selected, e.g., by a device access module that services the IO requests. For applications with "high" value of the error tolerance parameter, less reliable storage devices may be selected to store data, e.g., SSD devices with high wear levels, non-redundant disk configurations, etc. Further, in some implementations, where applications are associated with "high" value of the error tolerance parameter, the number of retries performed when an IO operation fails may be restricted, e.g., no retries, 1 retry, or less than a threshold number of retries. Selection of storage devices in this manner may save costs, e.g., by allowing cheaper storage to be utilized for applications that can tolerate high error rates. Selection of storage devices may be based on other parameters, besides the error tolerance parameter, e.g., based on a performance specification (e.g., in terms of response time) or other factors.

Access-Type Optimization Parameter

In some implementations, an access-type optimization parameter may be utilized by the device access module. For example, it may be determined whether the application that generates the IO requests uses a read-before-write paradigm. For example, if the application uses read-before-write, the access-type optimization parameter may be set to a value that specifies optimization order as update, delete, create, read, e.g., a value "UDCR." In implementations that use read-before-write, a create operation that specifies writing a key-value to the device succeeds only if the key is not present, and the operation fails if the key is already present.

In another example, if the application does not use read-before-write, the access-type optimization parameter may be set to a value that specifies optimization order as create, read, delete, update, e.g., a value "CRDU." In these implementations, a create operation that specifies writing a key-value to the device is performed if the key is not present, and if the key is already present, an update operation is performed to update the corresponding value.

The device access module (or other software) that implements the method may read the access-type optimization parameter and service the IO requests from the application accordingly. For example, a priority of servicing IO requests in the CRUD queues (if used) may be determined based on the access-type optimization parameter. The device access module may service IO requests from the application out of order, e.g., to prioritize one type of IO operation over other types, based on the access-type optimization parameter.

In another example, a total size of write-buffers or read-buffers may be based on the access-type optimization parameter. In some implementations, e.g., where the application does not specify a device type or device identifier of a device to fulfill an IO request, the device type (e.g., SSD storage, hard-disk storage, tape storage, etc.) and/or device identity (e.g., internal storage device, external storage device, network-attached storage device, etc.) may be selected based at least in part on the access-type optimization parameter.

Storage-Container parameter

In some implementations, a parameter that specifies whether an application uses storage containers and optionally, a type of storage container may be utilized by the device access module. Storage containers may be similar to those described in the related U.S. provisional application Ser. No. 62/651,995 filed on Apr. 3, 2018.

For example, the storage-container parameter may specify a type of the storage container, e.g., optimized for throughput, optimized for storage capacity, etc. Further, the type of storage container or storage devices that are utilized for the storage container may be based on other parameters, e.g., the error tolerance parameter.

Block 208 may be followed by block 210.

In block 210, resources may be allocated by the device access module based on the IO parameters. For example, such resources may include buffers, caches, etc.

In some implementations, the size in bits of the prior IO requests as specified in the application profile may be utilized to determine a size of the buffer to allocate for the application. In some implementations, the size of the buffer may be based on a respective proportion of each type of IO operation (create, read, update, delete) in the prior IO requests, indicated in the application profile. For example, a large read buffer may be allocated to applications where the application profile indicates a relatively large proportion (e.g., 70%) of IO operations in the prior IO requests were of the type R. In some implementations, the allocated buffers may be partitioned, e.g., into sub-buffers, or implemented as separate buffers for different types of IO operations, In these implementations, the size of buffer for each type of operation may be based on the proportion of that type of operation in the prior IO requests, as indicated in the application profile. In some implementations that utilize a read buffer (e.g., read-buffer parameter is set to "yes") a size of the read buffer may be based on a size (e.g., an average size, a total size within a request group, a median size, etc.) of data read in read operations of the prior IO requests, as indicated in the application profile.

In some implementations, the IO request(s) received in block 202 may include a plurality of IO operations. A respective size of the IO operations may be determined, e.g., a size of data access to fulfill each IO operation (e.g., "read 50 KB," "write an object of size 1 MB," "delete 16 bytes," update a key-value pair, with a total size of 10 KB," etc.). In some implementations, two or more operations of the plurality of IO operations may be grouped (batching). For example, such grouping may be performed such that a combined size of the data access for the operations is less than or equal to a size of buffer (e.g., a read buffer, a write buffer, etc.) allocated for the application. In some implementations, it may be determined that a size of an IO operation (e.g., read operation) in the IO request is larger than a size of the corresponding buffer (e.g., read buffer). In response to such determination, the IO operation may be split into a plurality of sub-operations such that a size of each sub-operation (e.g., a size of data read in the sub-operation) is less than or equal to the size of the buffer.

In some implementations, buffers may be allocated in integer multiples of size of an addressable unit of physical memory of the computing device that implements method 200. Grouping (batching) or splitting (chunking) IO operations as described above may improve IO performance, since the size of IO operations matches the size of allocated buffers, which may reduce or eliminate situations where a buffer insufficient for an operation, or a buffer is underutilized. The method continues to block 212.

In block 212, one or more devices, e.g., storage devices, may be provisioned and allocated to the application that provided the IO request by the device access module. For example, one or more storage devices that were previously unallocated (or may be partially utilized by another application), may be selected to fulfill the IO request. Block 212 may be followed by block 214.

In block 214, the IO request from the application is fulfilled by the by the device access module by accessing the device. For example, data may be written to a storage device based on a write operation in the IO request, data may be read from a network device based on a read request, etc. In some implementations, where the device accessed to fulfill the IO request is a storage device, one or more hardware characteristics of the storage device may be determined by the device access module, and used to access to the storage device. For example, the one or more characteristics may include a physical type of storage unit in the storage device (e.g., a flash memory cell, a hard disk block, a DRAM cell, etc.), a block size configured for the storage device (e.g., 4 KB, 16 KB, etc.), one or more configuration parameters of the storage device (e.g., serial access capable, parallel access capable, capable of fast reads and slow writes, etc.), or a size of the storage device (e.g., 4 GB, 4 TB, 4 MB, etc.) may be determined. In some implementations, the application profile may also specify configuration parameters regarding accessing a storage device, e.g., a number of retries, a number of bits per cell for a flash memory device, etc. For example, the application developer may set such parameters (which act as hints to the device access module) based on application functionality (e.g., whether the application is built to tolerate storage errors, whether the application has built-in functionality to retry when a storage IO request fails, etc.). Block 214 may be followed by block 216.

In block 216, the IO requests may be analyzed. For example, analysis of the IO requests may be similar to that described above with reference to analysis of prior IO requests to obtain the application profile, as described with reference to block 220 above. In some implementations, the IO requests may be analyzed by the device access module. In some implementations, the IO requests may be analyzed by an analytics module separate from the device access module. Block 216 may be followed by block 218.

In block 218, the application profile may be updated based on the analysis of IO requests performed in block 216. For example, one or more IO parameters in the application profile may be updated based on the analysis. In various implementations, updating the application profile may be performed by the device access module, by an analytics module, or a combination. Block 218 may be followed by block 202, where further IO requests may be received from the application.

Method 200 provides several technical benefits. For example, by providing application profiles that include IO parameters to access a device, the method enables devices such as storage and/or network devices to be accessed in a manner that is application (or workload) specific and is optimized for the application. One or more settings of the storage device may also be set based on the IO parameters, such that workload-specific optimization is applied to the device hardware (e.g., block size, error correction capability, etc. in an SSD device). The parameters specified in the application profile are utilized, e.g., by a device access module implemented as part of the application and/or separate from the application but executing as a user space process. Different applications running on the same computing device can, therefore, be associated with different IO parameters and thus, each application benefits from an IO configuration suited to the application characteristics.

Further, the IO parameters may be specified statically in the application profile, e.g., by the application developer, based on the application type, etc. and/or learned dynamically, e.g., by analyzing prior IO requests from the application. The IO parameters can be updated at runtime, e.g., by analyzing IO performance when particular IO requests are fulfilled and making adjustments to the IO parameters. IO parameters can help optimize IO for an application such as storage accesses, e.g., by providing application-specific caches, IO operation specific queues (e.g., separate queues for each of CRUD), buffers sized to meet application-generate IO, use of zero copy technique, selective use of journaling, logical-to-physical block address mapping, selective use of data redundancy for applications that require error tolerance, prioritization of specific types of IO operations over other operations, use of storage containers, etc. Different combinations of such parameters allow a computing device that implements method 200 to meet the quality of service expectations from different types of applications, with minimal or no changes to hardware.

Further, the method can be implemented for applications in any execution environment, e.g., an application executing on an OS, an application executing in a virtualized environment, an application executing Java virtual machine, etc. In some implementations, method 200 may provide quality of service (QoS) guarantee for IO operations, e.g., by enabling IO requests to be fulfilled deterministically, e.g., within a predictable range of time from receipt of the request.

While method 200 has been described with reference to various blocks in FIG. 2, it may be understood that techniques described in this disclosure may be performed without performing some of the blocks of FIG. 2. For example, in some implementations, e.g., where the IO requests specify the device to be used, block 206 is not performed.

In some implementations, one or more of the parameters described with reference to block 208 above may be omitted, or other parameters may be used. In some implementations, one or more of the blocks illustrated in FIG. 2 may be combined. For example, blocks 210, 212, and 214 may be combined. In some implementations, the blocks may be performed in different order, e.g., block 208 may be performed before block 206. Other combinations of blocks are possible.

In another example, blocks 216 and 218 may not be performed, e.g., if a computing device that implements method 200 does not have enough computing capacity to analyze IO request data or to update application profiles. In some implementation, blocks 216 and 218 may be performed offline, and not in real-time e.g., separate from fulfilling IO requests.

In some implementations, a sampling technique may be applied to determine whether blocks 216 and 218 are to be performed. For example, upon fulfillment of IO requests, it may be determined whether the IO request fulfills a sampling criterion. Sampling criterion may specify, e.g., that every Nth (e.g., tenth, hundredth, thousandth, etc.) IO request be included in the sample; choose requests to include in the sample randomly with a sampling rate, e.g., 1%, 5%, 10% of all requests, etc. In some implementations, the sampling technique may be performed over a particular time period (e.g., 1 minute, 1 hour) and repeated or modified in subsequent time periods.

In some implementations, the sampling rate (e.g., the proportion of requests in the sample to all fulfilled IO requests) may be determined dynamically. For example, it may be determined whether the performance of a system that fulfills IO requests meets a performance threshold. If the performance does not meet the threshold, the sampling rate may be increased (and vice versa). In some implementations, multiple performance thresholds may be utilized, each leading to a corresponding change in the sampling rate.

In the implementations that utilize sampling techniques, blocks 216 and 218 are performed if a particular request is included in the sample. Else, blocks 216 and 218 are not performed.

In some implementations, one or more of blocks 208, 210 and 212 may be performed selectively. For example, one or more of blocks 208-212 may be performed only if the application profile is updated in block 218. In some implementations, particular individual blocks of blocks 208-212 are performed based on whether there is an update to the application profile, and on the type of update. For example, if there are no changes to buffers or caches based on the updated application profile, block 210 may not be performed. If no additional devices are to be provisioned based on block 208 and block 210, block 212 may not be performed.

The method 200 described with reference to FIG. 2 may be usable to access a device to fulfill input/output (IO) requests. In some implementations, the device accessed may be a storage device, e.g., a volatile memory (e.g., DRAM, SRAM, etc.) and/or non-volatile memory (e.g., NVRAM, MRAM, flash memory, hard disk drive, phase change memory, 3D Xpoint™, resistive RAM, etc.). In some implementations, the device may be a storage device, e.g., a hardware storage device accessible physically coupled to a computing device that implements the driver, a hardware storage device accessible via a network to which a computing device that implements the driver is coupled, both physically-coupled and network-based storage devices, etc.

In some implementations, the device may be a network or compute device, e.g., a network-attached storage device, a server or other computing device accessible at a particular network address, etc.

In some implementations, the method 200 described with reference to FIG. 2 may be implemented as part of a device driver or device access module. Driver, device driver, or device access module, as used herein, refers to software code that is operable to access a device. In some implementations, such code for the device access module may be provided as part of an application, as a standalone executable, as part of an application execution environment or operating system, etc. In some implementations, the software code for the device access module may be provided as part of other software, e.g., storage software, network-access software, hypervisor, other application software, etc. In some implementations, the driver may be implemented in user space, e.g., distinct from the operating system kernel that executes in kernel space.

Implementing the device access module in user space, e.g., as part of an application and/or as a separate executable may provide certain advantages, e.g., it may allow for zero copy technique to be utilized. Further, such implementations may have easy upgradability, e.g., compared to implementations where the device access module is implemented as part of the operating system. User space implementation can also make IO more efficient by reducing context switches between user space and kernel space when performing IO operations. Further, the device access module can provide enhanced security, e.g., when the module is implemented as part of the application itself.

In some implementations, the device access module may be implemented as a static or pre-compiled driver, e.g., with a fixed set of IO parameters and application profiles. In these implementations, the module may support one or more predetermined configurations, and may not adapt during runtime to requests (e.g., IO requests) from different types of applications. The one or more predetermined configurations may include configurations for specific types of applications, e.g., applications that use NoSQL databases such as applications that access or process data from Internet-of-Things devices, sensor data, webpage click data, online advertising data, and the like; OLTP applications that use a relational database; applications that utilize object storage, such as image or video applications, etc. The IO parameters in the application profile may be predetermined based on an identity of the application and/or the configuration of a computing device that services the IO requests.

In some implementations, the device access module may be reconfigured dynamically, e.g., during execution or periodically, e.g., by utilizing the techniques to update the application profile, as described with reference to blocks 216, 218, and 220. In these implementations, implementing the module as a runtime or dynamic driver may offer several benefits over static, pre-compiled drivers. For example, one or more IO access parameters used to access a device may be updated during driver execution, e.g., based on processed IO requests, based on characteristics of one or more devices (e.g., service levels guaranteed by storage hardware) that are accessed to fulfill requests, behavior of other applications that execute on the same computing device, e.g., in a multi-tenant configuration, etc.

Figure 3A:
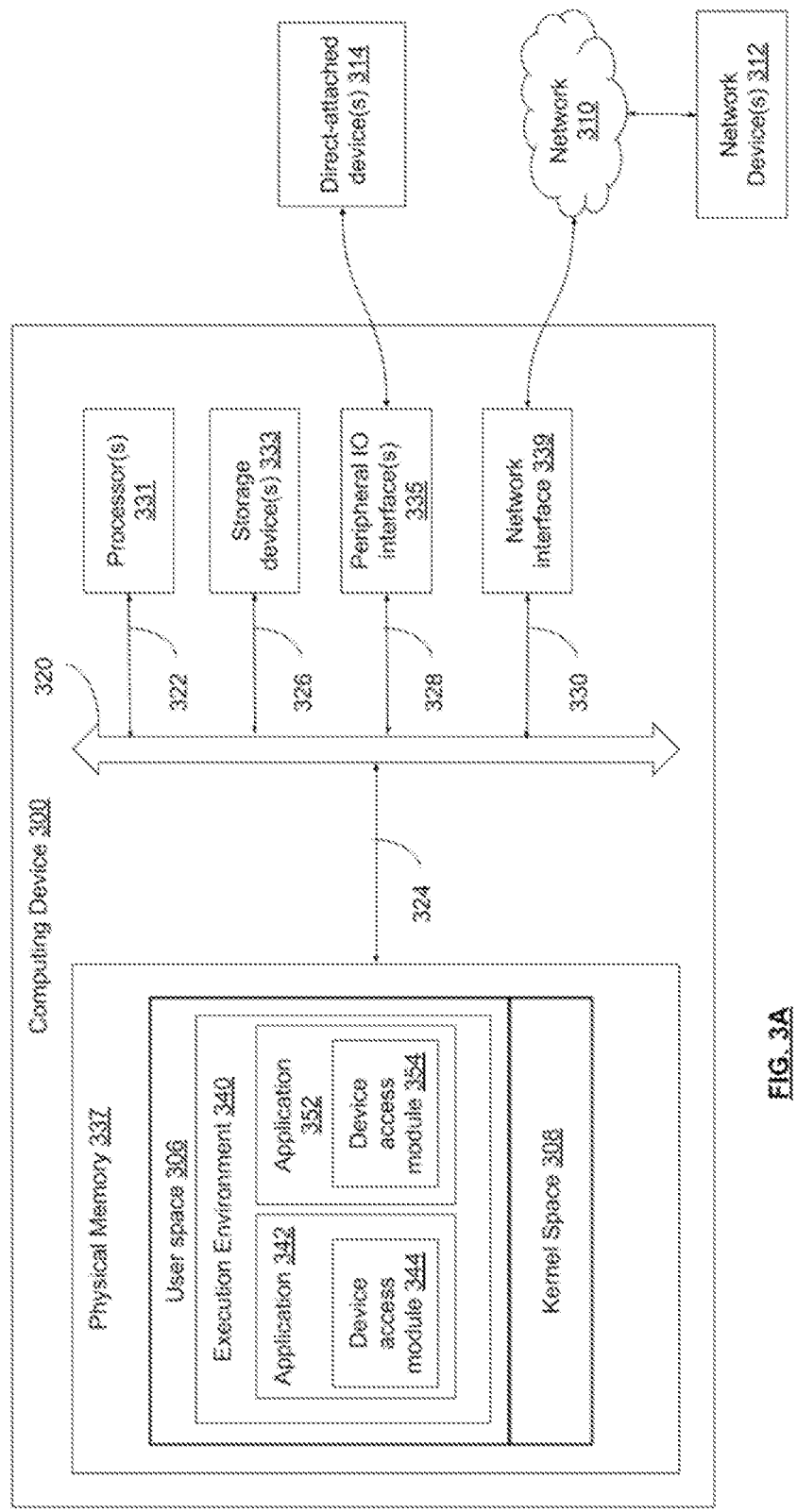
FIG. 3A illustrates a block diagram of an example computing device 300 which may be used for one or more implementations described herein.

FIG. 3A illustrates a block diagram of an example computing device 300 which may be used for one or more implementations described herein. The computing device 300 may be a server system 102, a server device 104 or 106, etc. The computing device 300 may include a processor 331, one or more storage devices 333, peripheral input-output interface(s) 335, a physical memory 337, and a network interface 339. The components of the computing device 300 may be communicatively coupled by a bus 320.

Processor 331 includes an arithmetic logic unit, a microprocessor, a general purpose controller, or another processor array to perform computations and to perform input-output (IO) operations. Processor 331 processes data and may include various computing architectures including a complex instruction set computer (CISC) architecture, a reduced instruction set computer (RISC) architecture, or an architecture implementing a combination of instruction sets. Although FIG. 3 includes a single processor 331, multiple processors 331 may be included. Other processors, sensors, displays, and physical configurations may be part of the computing device 300. Processor 331 is coupled to the bus 320 for communication with the other components via signal line 322.

Storage device(s) 333 may be a non-transitory computer-readable storage medium that stores data. Storage device(s) 333 may be a DRAM device, an SRAM device, an MRAM device, hard disk, flash memory, a ReRAM device such as 3D XPoint™, or some other memory device. In some implementations, the storage device 333 can include a compact disk read only memory (CD ROM) device, a digital versatile disk ROM (DVD ROM) device, a DVD RAM device, a DVD re-writable (RW) device, a tape drive, or some other mass storage device. Storage device(s) 333 are coupled to bus 320 for communication with the other components via signal line 326.

In some implementations, peripheral IO interface(s) 335 may also be included in device 300. For example, peripheral IO interface(s) 335 may include a universal serial bus (USB), secure digital (SD), category 5 cable (CAT-5), or similar port for wired communication with a direct-attached device(s) 314 that are physically coupled to computing device 300. Peripheral IO interface(s) 335 are coupled to bus 320 for communication with the other components via signal line 328.

Physical memory 337 stores instructions that may be executed by the processor 331 and/or data. The instructions may include code for performing the techniques described herein. The memory 337 may be a dynamic random access memory (DRAM) device, a static RAM, or some other memory device. In some implementations, the memory 337 also includes a non-volatile memory, such as an (SRAM) device or flash memory, or some other mass storage device for storing information on a more permanent basis. Memory 337 includes code and routines operable to execute the applications 342 and 352, as well as device access modules 344 and 353, which are described in greater detail below. The memory 337 is coupled to the bus 320 for communication with the other components via signal line 324.

During use of computing device 300, physical memory 337 may be partitioned into user-space memory 306 and kernel space memory 308. User space memory 306 may store various applications, e.g., application 342, application 352, etc. In some implementations, an application may include a device access module fully or partially. For example, application 342 includes a device access module 344, e.g., incorporated as a code library. In these implementations, input-output (IO) requests from the application may be processed by device access module 344. In some implementations, application 352 partially includes device access module 354.

In these implementations, portions of executable code of device access module 354 are implemented separately from the application 352. For example, a portion of device access module 354 may be incorporated as a code library in application 352, while other portions are implemented separately from application 352. In these implementations, input-output (IO) requests from the application may be processed by device access module 354.

In some implementations, a device access module may be implemented as a standalone application (not shown). In these implementations, application code excludes device access code, and input-output requests from the application may be sent to the standalone device access module. Device access module(s) 344 and 354 may include software code that implements method 200 to access a device to fulfill an IO request.

In some implementations, kernel space memory 308 may be accessible by an operating system of the computing device 300 and may be restricted from access by software applications (e.g., application 342, application 352, device access modules 344 and 354, etc.) Network interface 339 transmits and receives data to and from a network 310. Network 310 may couple device 300 with network device(s) 312. In some implementations, network interface 339 includes a wired (e.g., Ethernet, Gigabit Ethernet), wireless, or optical interface to network 310 (e.g., via a network switch, router, hub, etc.). In some implementations, network interface 339 includes a wireless transceiver for exchanging data using one or more wireless communication methods, including IEEE 802.11, IEEE 802.16, Bluetooth® or another suitable wireless communication method. In some implementations, the network interface 339 includes a cellular communications transceiver for sending and receiving data over a cellular communications network. In some implementations, network interface 339 includes a wired port and a wireless transceiver. Network interface 339 is coupled to the bus 320 for communication with the other components via signal line 330.

Figure 3B:
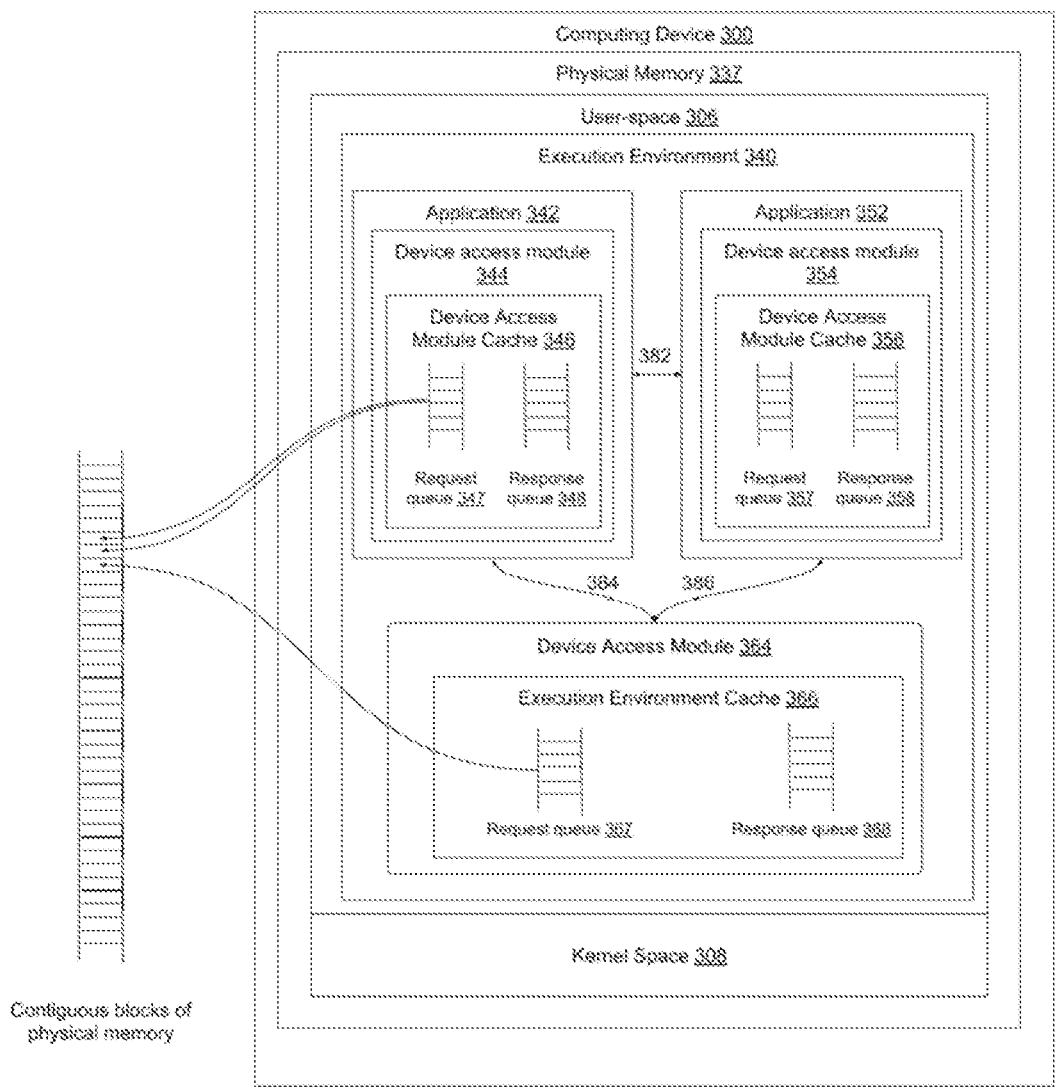
FIG. 3B illustrates a block diagram of the example computing device 300 which may be used for one or more implementations described herein.

FIG. 3B illustrates a block diagram of the example computing device 300 (certain elements shown in FIG. 3A are omitted for clarity). As illustrated in FIG. 3B, applications 342 and 352 may execute on the computing device 300, within an execution environment 340 that is stored in a user-space partition 306 of physical memory 337. Application 342 may include software code that implements device access module 344. Device access module 344 may include a device access module cache 346 that includes a request queue 347 and/or a response queue 348, based on IO parameters in the application profile for application 342. Application 352 may include software code that implements device access module 354. Device access module 354 may include a device access module cache 356 that includes a request queue 357 and/or a response queue 358, based on IO parameters in the application profile for application 342. While two applications are illustrated in FIG. 3B, any number of applications may execute within execution environment 340. For example, in a single tenant configuration, only one application may execute in the execution environment 340, while in a multi-tenant configuration, two, three, or any number of applications may execute in the execution environment 340.

While FIGS. 3A and 3B show two applications 342 and 352 that each include a respective device access module, it may be possible to implement the device access module separate from the application, e.g., as a standalone module 364, executing as a user space application. Further, in some implementations, device access modules 344 and 354 (within applications 342 and 352, e.g., included using a code library) may be implemented together with standalone device access module 364.

Device access module 364 may include a request queue 367 and/or a response queue 368. Blocks of physical memory 337 may be allocated to implement each of the queues 347, 348, 357, 358, 367, and 368). In some implementations, memory blocks that are used to implement a queue may be contiguous, e.g., any of queues 347, 348, 357, 358, 367, and 368. The memory blocks used to implement a queue may be accessible by the application that implements the device access module and the standalone device access module 364. For example, request queue 347 may be modified by device access module 344 and device access module 364, but not by device access module 354 that is part of application 352. Memory blocks that are used to implement queues 367 and 368 may be restricted such that these can be accessed only by the module 364. The queues may be implemented based on IO parameters specified in the application profile, e.g., the cache type parameter, the read-buffer parameter, the write-buffer parameter, etc. described above.

In implementations that include standalone device access module 364, module 364 may coordinate fulfillment of IO requests from various applications, e.g., applications 342 and 352. For example, module 364 may communicate, e.g., via inter-process communication (IPC) messages 384 and 386 respectively, with modules 344 and 354, and service IO requests from respective applications 342 and 352. Module 364 may also include functionality to arbitrate between IO requests arriving from different applications, assign priorities based on request type, application identity, etc.

In some implementations, device access module 364 may be omitted. In these implementations, modules 344 and 354 may communicate directly, e.g., in a peer-to-peer manner, via inter-process communication messages 382. In these implementations, two or more applications may communicate with each other. In some implementations, the applications may share, in an asynchronous manner, a summary state of IO requests. For example, information exchanged between the applications may include control plane messages that allow hard arbitration. In some implementations, IPC messages 382 may include information indicative of IO requests generated by each application, e.g., a type of the request (CRUD), a priority of the request, a size of the IO requested, etc. Each of modules 344 and 354 may be implemented to evaluate the IO requests, and may selectively back-off, e.g., delay their own IO requests, in the presence of higher priority requests from other modules. In some implementations, IO requests from different modules may be fulfilled using round-robin techniques, by implementing an oldest-request serviced first prioritization of IO requests, or by other similar techniques. In some implementations, a module that is starved of access to a device (e.g., has a queue of unfulfilled IO requests larger than a threshold queue size) may be enabled to send IPC messages 382 requesting other modules to back-off.

In some implementations, IPC messages 382 may be exchanged between modules 344 and 354 in a peer-to-peer manner, even when a central standalone module 364 is implemented. In these implementations, each peer module (modules 344 and 354) may implement a back-off technique to reduce or delays its IO requests in the presence of IO requests from other applications. If a particular module is starved of device access (e.g., has a queue of unfulfilled IO requests larger than a threshold queue size), such a module may notify central module 364. Central standalone module 364 may be configured to send commands via IPC messages 384 and 386 to other modules to back-off (e.g., delay or cancel IO requests) when notified by the particular module. In some implementations, central standalone module 364 may perform an initial allocation of resources to peer modules, and subsequently, determine metrics for each peer module, and adjust the allocation based on the determined metrics.

In various implementations, device access module software code may be provided as a library that can be incorporated in any type of application that executes on computing device 300, e.g., within execution environment 340.

Figure 4:
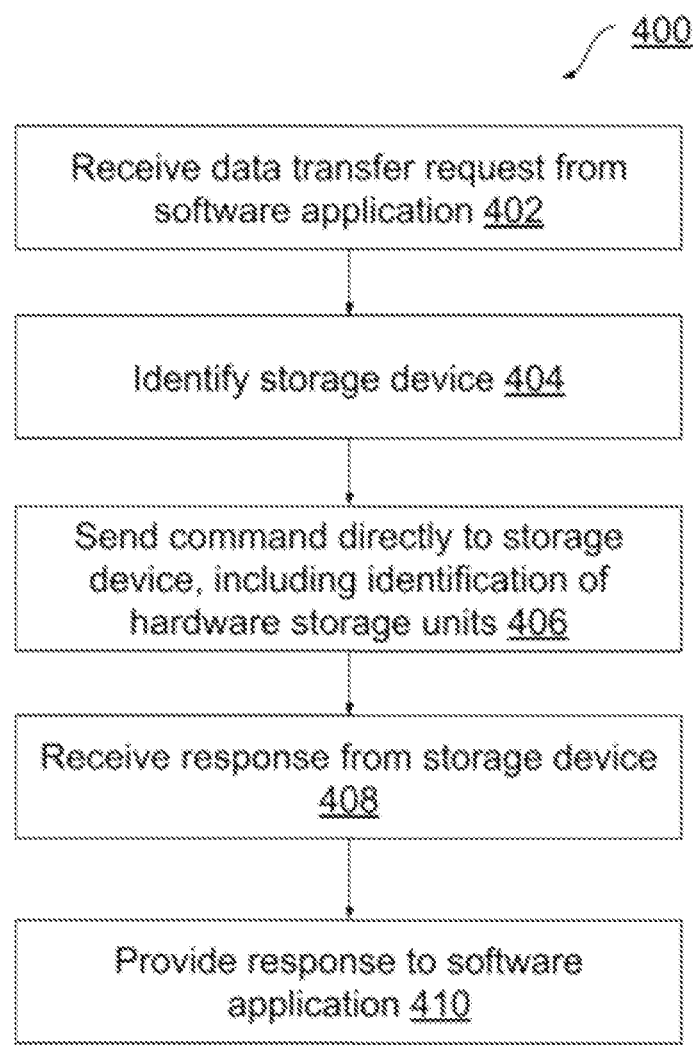
FIG. 4 illustrates an example method 400 for data transfer between a software application and a storage device, according to some implementations.

FIG. 4 illustrates an example method 400 for data transfer between a software application and a storage device. In some implementations, the method 400 may be implemented within a software application, e.g., by incorporating a software library that implements the method. In some implementations, the method may be implemented as a separate software driver that executes in the same application execution environment (e.g., a virtual machine) as a software application and that is accessible by the software application via an application-programming interface (API). In some implementations, a portion of the method may be implemented in a software application, and another portion of the method may be implemented as a software driver.

In the various implementations described herein, the software application is allocated user space memory within the physical memory of a computing device on which the software application executes. The user space memory allocated to the software application is accessible by executing code of the software application, including the software library that implements method 400. In the implementations in which the method is implemented as a separate software driver, at least a portion of the user space memory allocated to the software application is shared with the software driver, in a shared memory configuration. In these implementations, the software driver is configured such that it can read data from and/or write data to the portion of the user space memory that is shared. Such sharing enables the software driver to perform storage operations (e.g., read or write from a storage device) without making intermediate copies of data, as described below.

At block 402, a data transfer request is received from a software application. For example, the request may be received from executing code of the software application by the software library incorporated within the software application, or by the software driver. For example, the data transfer request may be a request to access a storage device, e.g., a storage device that is part of a computing device that executes the method 400 or is accessible by the computing device over a device interface, such as a network interface. The data transfer request may be a request to read data from the storage device, or a request to write data to the storage device.

In some implementations, e.g., when the data transfer request is to write data to a storage device, the request may include the data to be written. In some implementations, the data may comprise one or more data units, each having a particular size, e.g., 1 KB, 1 MB, 10 MB, etc.

At block 404, a storage device is identified based on the data transfer request. For example, the request may include an identifier of the storage device, e.g., a hardware identifier, port to which the storage device is coupled, etc. For example, requests to read data may specify the device that stores the data. In another example, the request may not include an identifier of the storage device. For example, a request to write data may not specify a storage device to which the data is written. In another example, the data transfer request may specify device parameters (e.g., reliability, access speed, media type, etc.). In this example, a storage device is identified that has those parameters.

In some implementations, e.g., that utilize storage containers that organize hardware storage units into logical groupings, identifying the storage device may include retrieving storage container definition, e.g., the logical organization of hardware storage units into storage containers. In these implementations, a request to read data may be analyzed to determine a storage container specified in the data transfer request, and the storage container definition is accessed to map from a logical address within the storage container to a physical address (e.g., a particular page or block of an SSD device) where the data is stored. In some implementations, a request to write data may be analyzed to identify a storage container that is suitably configured for the data to be written. For example, the request to write data may specify parameters such as a time limit within which the data is to be written, a reliability requirement for the data, etc. Based on the parameters, the storage container definition is accessed to determine the storage container and a hardware storage device within the storage container is identified. The method continues to block 406.

At block 406, a command is sent to the identified storage device. The command includes identification of hardware storage units (e.g., physical address) within the storage device that are to be accessed to fulfill the data transfer request. For example, when the storage device is a solid-state storage device (SSD), the hardware storage units may be a memory cell (e.g., a flash memory cell), a page comprising a plurality of memory cells, a storage block comprising a plurality of pages, a chip comprising a plurality of storage blocks, etc. The SSD may include a plurality of chips, organized into one or more channels. Each hardware storage unit in the storage device may be associated with a respective address. For example, the address of a hardware storage unit may be specified as a combination of SSD device name, channel, chip, block, page, etc.

In some implementations, sending the command may include sending data to the storage device. For example, if the data transfer request is to write data to the storage device, the command may include one or more addresses of hardware storage units within the storage device, and respective data units to be written to the hardware storage units. In these implementations, the data to be written to the storage device is read directly from user space memory allocated to the application and is sent to the storage device. In the implementations where a software driver implements the method, the data transfer request may include a pointer to a memory address within the user space memory allocated to the software application from which the data is to be retrieved. Reading data directly from user space memory reduces memory requirements, since no intermediate copies of the data are stored, and also reduces the time required for write operations since write operations are completed without having to make intermediate copies.

In conventional systems, sending the command and/or data to a storage device from an application requires a context switch to the operating system, since the operating system is responsible for managing access to storage devices, and stores information (e.g., device addresses, filesystem, file metadata, etc.) that is necessary to identify the storage device and to generate the command. In some implementations of the present disclosure, sending the data to the storage device is performed without a context switch from the software application to an operating system. The present disclosure eliminates the context switch, e.g., since the hardware address that the data is to be written to or read from is known to the software application or software driver that manages data transfer to the storage device. Sending the command and/or data without the context switch reduces the time required for the data to be sent and may enable the data transfer request to completed quicker than in conventional systems that require a context switch. The method continues to block 408.

In block 408, a response is received from the storage device. For example, the response may indicate success (e.g., data was written successfully to the storage device) or failure (e.g., a request to read data from the storage device was unsuccessful). In some implementations, e.g., when the request is to read data from the storage device, receiving the response includes receiving the data that is read from the hardware storage units that were specified in the command. In these implementations, the method 400 may further include writing the received data directly to user space memory that is accessible by the software application, e.g., user space memory that is allocated to the application, without making intermediate copies. In the implementations where a software driver performs the read operations, a portion of the user space memory allocated to the software application may be shared with the software driver, such that the software driver can read data from and write data to the portion of the user space memory that is shared.

In conventional systems where an operating system manages access to hardware storage devices, data that is read from a hardware storage device may be first received in kernel space memory that is accessible by the operating system, but not by a software application. In these systems, to make the data accessible to the application, the data needs to be copied to user space memory, and a context switch be performed to the software application upon completion of the copying. Such transfer of data to kernel space, and then copying it to user space memory, prior to the context switch can reduce throughput, e.g., since the application may spend longer time waiting for the data to be read. Directly accessing the storage device without a context switch to the operating system, and receiving the data and writing it to user space memory can improve throughput, since the application can utilize the data as soon as it is written to the user space memory. The method continues to block 410.

In block 410, the response is provided, e.g., by the software driver, or by the library that is part of the software application, to the software application (e.g., executing code) that sent the data transfer request. For example, if the request is a request to write data to storage, the response may indicate success or failure of the request. If the request is a request to read data from storage, providing the response may include providing a pointer to a memory address within the user space memory where the data is written.

Method 400 has technical benefits over prior techniques to access storage devices to fulfill data transfer request. For example, in conventional techniques, writing data to the storage device may require multiple steps. For example, if the application is implemented within an execution environment such as a virtual machine executing on top of an operating system, e.g., that arbitrates hardware access requests from multiple applications, IO requests from the application may be passed on to the operating system (OS). The OS may then implement a hardware driver, e.g., that accesses the storage device, executing in kernel space. In this example, to write data to a storage device requires a context switch from execution of the application code to execution of OS cod to perform a write to the hardware storage device. Confirmation that the data was written to the storage device may be provided to the OS which in turn may indicate to the application that the IO request was completed. The multiple steps may be costly, e.g., in terms of hardware resource utilization, time taken to complete an IO request, etc.

In contrast, some implementations of the techniques described herein may allow access to a device, e.g., a storage device, directly from the user space, e.g., by the software application or by the software driver. Such access may be referred to as "zero copy." In these implementations, read and write operations may be performed without a context switch to the operating system, as explained above. a user space driver may be used by one or more applications to directly access the device via a zero copy mechanism.

Figure 5:
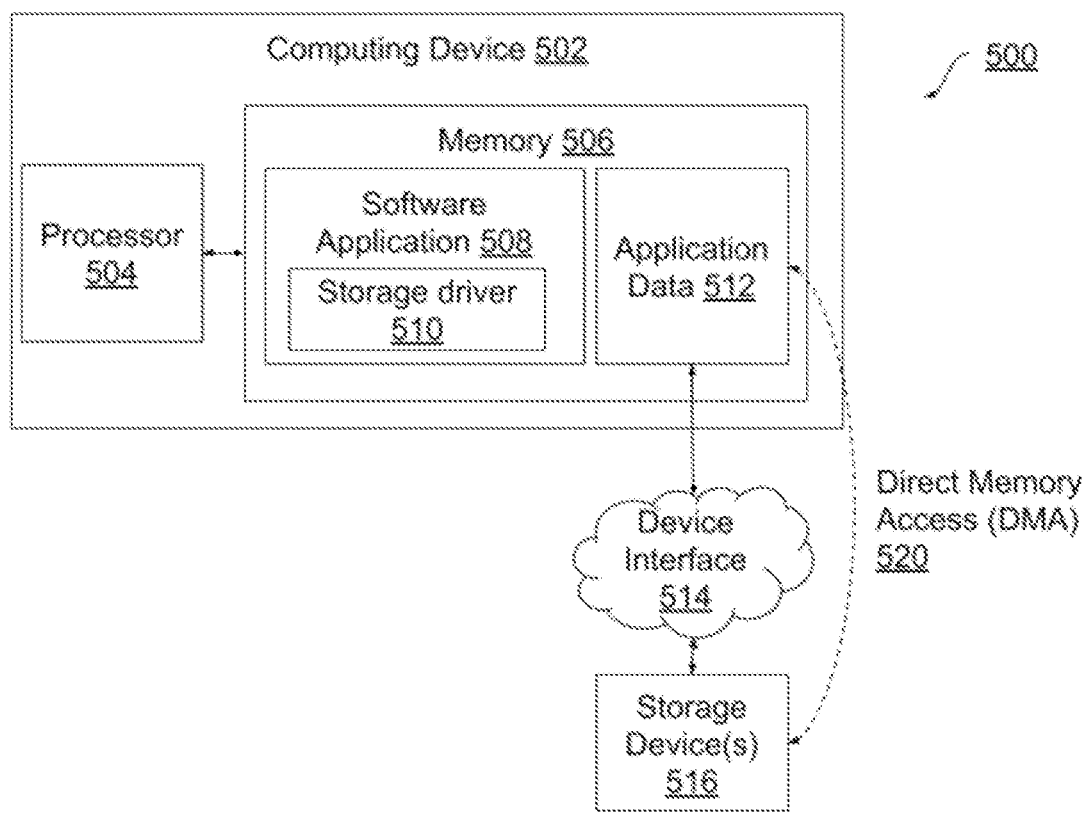
FIG. 5 illustrates a block diagram of an example environment 500 which may be used for one or more implementations described herein.

FIG. 5 illustrates a block diagram of an example environment 500 which may be used for one or more implementations described herein. As illustrated in FIG. 5, a computing device 502 includes a processor 504 and memory 506 coupled to the processor 504. A software application 508 (e.g., executable code of the software application) is loaded in memory 506, e.g., in an application execution environment, for execution by processor 504. Computing device 502 is coupled to a device interface 514 which in turn is coupled to storage device(s) 516. In some implementations, device interface 514 may be a peripheral interface (e.g., USB) or a network interface. In some implementations (not shown), storage device(s) 516 may be part of computing device 502, e.g., as internal storage device(s) such as hard disk drives, SSD storage, etc. In these implementations.

In the example illustrated in FIG. 5, software application 508 includes a storage driver 510. For example, storage driver 510 may be executable code that is part of the software application, or incorporated as a library. In some implementations, the storage driver may be implemented separate from the software application, but within the application execution environment. In these implementations, the software application may communicate with the storage driver 510 via inter-process communication (IPC) or by utilizing an application programming interface (API). Storage driver 510 enables software application 506 to access storage device(s) 516 by specifying a data transfer request.

Memory 506 may include application data 512. For example, a portion of memory 506 may be allocated to software application 508, e.g., by an application execution environment such as a hypervisor, or by an operating system. While FIG. 5 shows a single software application 508, it will be understood that any number of software applications may be stored in memory 506. Application data 512 may be accessible by software application 508 and storage driver 510, but not by other applications that execute on computing device 502.

As explained with reference to FIG. 4, data may be transferred directly between application data 512 and storage device(s) 516 via direct memory access 520. Direct memory access 520 refers to access of a storage device from software application 508 without a context switch to an operating system of computing device 502, such that data from application data 512 is written directly to storage device(s) 516, and data read from storage device(s) 516 is directly written to application data 512.

With the use of direct memory access (DMA), no intermediate copies of data are made such that a write operation results in data from the software application, e.g., within user space memory allocated to the software application, being written directly the storage device, and a read operation results in data being read from the storage device directly into the user space memory allocated to the software application. By performing storage device access in this manner, the methods described herein enable fast access to storage devices with a predictable rate of access, thereby allowing software applications to perform data access within specific time periods. In some implementations, the rate of access may be deterministic, e.g., where the time required for data access is proportional to the amount of data access and known ahead of accessing the storage device.

One or more methods described herein (e.g., method 200 and/or method 400) can be implemented by computer program instructions or code, which can be executed on a computer. For example, the code can be implemented by one or more digital processors (e.g., microprocessors or other processing circuitry or hardware), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processing units (or GPUs), application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
   receiving an IO request from an application, wherein the IO request includes a plurality of IO operations;
   determining an application profile for the application;
   allocating a buffer for the application, wherein a size of the buffer is determined based on one or more prior IO requests from the application;
   determining a respective size of the plurality of IO operations;
   grouping the plurality of input or output operations into one or more groups, wherein each group has a combined size that is less than or equal to the size of the buffer; and
   accessing a device to fulfill the IO request using the buffer to store application data.

2. The computer-implemented method of claim 1, further comprising:
   based at least in part on the application profile, setting one or more IO parameter values to access the device; and
   wherein accessing the device is based on the one or more TO parameter values.

3. The method of claim 2, further comprising, prior to receiving the IO request, determining an application type of the application based on a configuration setting, and wherein the determining the application type is performed in response to detecting that the application has launched.

4. The method of claim 3, wherein the application type is determined as unknown, and wherein setting the one or more IO parameters is based on a default template that includes default values for the one or more IO parameters.

5. The method of claim 2, wherein receiving the IO request comprises receiving, from the application, at least one of the one or more IO parameter values, wherein the one or more IO parameter values include values of one or more of: a cache type parameter, a read-buffer parameter, a write-buffer parameter, a queue parameter, a journaling parameter, a mapping parameter, an error tolerance parameter, an access-type optimization parameter, or a storage-container parameter.

6. The method of claim 2, wherein the application profile is based on one or more of:
   an application type of the application determined based on an application identifier, a network port associated with the application, a source language for application code, an application execution environment in which the application executes, or application program code.

7. The method of claim 2, wherein the device includes a storage device, the method further comprises determining one or more hardware characteristics of the storage device, and wherein accessing the device comprises accessing the storage device based on the one or more hardware characteristics.

8. The method of claim 2, wherein determining the application profile is based on at least in part on the one or more prior IO requests from the application.

9. The method of claim 8, further comprising:
   analyzing the one or more prior IO requests to determine a respective proportion of create, read, update, and delete (CRUD) operations in the plurality of prior IO requests.

10. The method of claim 8, further comprising analyzing the one or more prior IO requests to determine a proportion of IO requests that result in a cache invalidation or a cache miss.

11. The method of claim 8, further comprising:
    analyzing a size in bits of the one or more prior IO requests, wherein the size in bits is of data accessed during the one or more prior TO requests; and
    based on the size of the one or more prior IO requests, determining a bandwidth used by the application.

12. The method of claim 8, wherein determining the application profile based on the one or more prior IO requests comprises:
    grouping the one or more prior IO requests into one of more request groups based on a time of arrival of each of the plurality of prior TO requests, wherein each request group is associated with a respective sampling period; and determining a value of a particular characteristic of the one or more prior IO requests in each request group.

13. The method of claim 8, further comprising:

allocating a buffer for the application, wherein a size of the buffer is determined based on the one or more prior IO requests from the application.

14. A computer-implemented method comprising:

receiving an IO request from an application;

determining an application profile for the application;

allocating a buffer for the application, wherein a size of the buffer is determined based on a respective type and proportion of each IO operation in one or more prior IO requests from the application, wherein the respective type is one of create, read, update, or delete (CRUD) and wherein the buffer is partitioned into respective sub-buffers for each of CRUD, and wherein the size of each sub-buffer is based on the respective type; and accessing a device to fulfill the IO request using the buffer to store application data.

15. A computer-implemented method, comprising:

receiving an IO request from an application, wherein the IO request includes a single input or output operation;

determining an application profile for the application;

allocating a buffer for the application, wherein a size of the buffer is determined based on one or more prior IO requests from the application;

determining that a size of the single input or output (IO) operation is larger than the size of the buffer;

splitting the single IO operation into a plurality of input or output sub-operations, wherein each sub-operation has a respective size that is that is less than or equal to the size of the buffer; and accessing a device to fulfill the IO request using the buffer to store application data.

* * * * *